United States Patent
Hagi

(10) Patent No.: US 10,569,723 B2
(45) Date of Patent: Feb. 25, 2020

(54) WIRE HARNESS WITH TUBE-SHAPED REINFORCED FIBER COVER

(71) Applicant: SUMITOMO WIRING SYSTEMS, LIMITED, Yokkaichi-shi, Mie (JP)

(72) Inventor: Masahiro Hagi, Yokkaichi (JP)

(73) Assignee: SUMITOMO WIRING SYSTEMS, LTD, Mie (JP)

( * ) Notice: Subject to any disclaimer, the term of this patent is extended or adjusted under 35 U.S.C. 154(b) by 0 days.

(21) Appl. No.: 16/465,889

(22) PCT Filed: Dec. 5, 2017

(86) PCT No.: PCT/JP2017/043573
§ 371 (c)(1),
(2) Date: May 31, 2019

(87) PCT Pub. No.: WO2018/116809
PCT Pub. Date: Jun. 28, 2018

(65) Prior Publication Data
US 2019/0299884 A1    Oct. 3, 2019

(30) Foreign Application Priority Data
Dec. 19, 2016    (JP) ................................ 2016-245812

(51) Int. Cl.
*B60R 16/02*    (2006.01)
*H01B 13/26*    (2006.01)
(Continued)

(52) U.S. Cl.
CPC ........... *B60R 16/0207* (2013.01); *H01B 7/00* (2013.01); *H01B 7/18* (2013.01); *H01B 13/26* (2013.01)

(58) Field of Classification Search
None
See application file for complete search history.

(56) References Cited

U.S. PATENT DOCUMENTS 7,750,241 B2 *   7/2010   Watanabe ........... B60R 16/0207
                                                    174/110 R
8,981,221 B2 *   3/2015   Sawada ............... B60R 16/0215
                                                    174/102 R
(Continued)

FOREIGN PATENT DOCUMENTS

JP         3071579 U     9/2000
JP       2009-107408 A   5/2009
(Continued)

OTHER PUBLICATIONS

Feb. 27, 2018 Seach Report issued in International Application No. PCT/JP2017/043573.

*Primary Examiner* — Timothy J Thompson
*Assistant Examiner* — Muhammed Azam
(74) *Attorney, Agent, or Firm* — Oliff PLC

(57) ABSTRACT

A wire harness includes a plurality of wires that include a plus high-voltage wire and a minus high-voltage wire. The plus high-voltage wire and the minus high-voltage wire are configured to be electrically connected to an in-vehicle high-voltage battery. The wire harness includes a sheathing material for collectively enclosing the plurality of wires, where the sheathing material is tube-shaped. The wire harness also includes a cover that covers an outer periphery of the sheathing material, where the cover is tube-shaped and made of an insulating reinforced fiber. The sheathing material includes a metal pipe having a bend that is bent along a wiring line, and the cover is provided in an area at least including the bend of the metal pipe.

2 Claims, 2 Drawing Sheets

(51) Int. Cl.
*H01B 7/00* (2006.01)
*H01B 7/18* (2006.01)

(56) References Cited

U.S. PATENT DOCUMENTS

| | | | | |
|---|---|---|---|---|
| 9,082,529 B2* | 7/2015 | Izawa | ............... | H01B 7/29 |
| 9,302,635 B2* | 4/2016 | Han | ............... | B60R 16/0222 |
| 9,327,661 B2* | 5/2016 | Itani | ............... | B60R 16/0215 |
| 9,331,461 B2* | 5/2016 | Itani | ............... | B60R 16/0215 |
| 9,343,821 B2* | 5/2016 | Fuzioka | ............... | H02G 3/32 |
| 9,550,461 B2* | 1/2017 | Nakai | ............... | H02G 3/0481 |
| 9,558,866 B2* | 1/2017 | Shiga | ............... | B60R 16/0215 |
| 10,238,019 B2* | 3/2019 | Ito | ............... | H05K 9/0098 |
| 2005/0045357 A1* | 3/2005 | Ichikawa | ............... | H02G 3/0431 174/50 |
| 2014/0165392 A1* | 6/2014 | Toyama | ............... | B60R 16/0215 29/825 |
| 2014/0238719 A1* | 8/2014 | Inao | ............... | B60R 16/0215 174/112 |
| 2014/0246231 A1* | 9/2014 | Adachi | ............... | B60R 16/0207 174/72 A |
| 2014/0262495 A1* | 9/2014 | Oga | ............... | H02G 3/0481 174/72 A |
| 2015/0179300 A1* | 6/2015 | Inao | ............... | B60R 16/0215 174/68.3 |
| 2015/0275408 A1* | 10/2015 | Tahara | ............... | D04C 1/06 87/9 |
| 2015/0340848 A1* | 11/2015 | Nakashima | ............... | C08G 18/4825 174/72 A |
| 2016/0144807 A1* | 5/2016 | Inao | ............... | B60R 16/0215 174/72 A |
| 2016/0164269 A1* | 6/2016 | Inao | ............... | B60R 16/0207 174/68.3 |
| 2016/0229359 A1* | 8/2016 | Nakai | ............... | B60R 16/0215 |
| 2017/0001580 A1* | 1/2017 | Hagi | ............... | B60R 16/0215 |
| 2017/0129423 A1* | 5/2017 | Sugino | ............... | B60R 16/0215 |
| 2017/0129424 A1* | 5/2017 | Nagahashi | ............... | B60R 16/0215 |
| 2018/0001849 A1* | 1/2018 | Abe | ............... | B60R 16/023 |
| 2018/0174709 A1* | 6/2018 | Hagi | ............... | H01B 7/0045 |
| 2019/0299884 A1* | 10/2019 | Hagi | ............... | H01B 7/00 |

FOREIGN PATENT DOCUMENTS

| | | |
|---|---|---|
| JP | 2010-097851 A | 4/2010 |
| JP | 2015-183303 A | 10/2015 |
| JP | 2016-63557 A | 4/2016 |

* cited by examiner

WIRE HARNESS WITH TUBE-SHAPED REINFORCED FIBER COVER

This application is the U.S. National Phase of PCT/JP2017/043573 filed Dec. 5, 2017, which claims priority from JP 2016-245812 filed Dec. 19, 2016, the entire disclosure of which is incorporated herein by reference.

BACKGROUND

The present disclosure relates to an in-vehicle wire harness.

Conventionally, a vehicle such as a hybrid vehicle or an electric vehicle includes a motor that serves as a motive power source for moving the vehicle, an inverter that is connected to the motor, and a high-voltage battery for supplying power to the inverter, and the inverter and the high-voltage battery are connected to each other by a wire harness, which includes two, namely plus and minus high-voltage wires, as described in JP 2016-63557A, for example. The high-voltage wires are collectively enclosed by a tube-shaped sheathing material.

SUMMARY

In the case of using a wire harness that is electrically connected to an in-vehicle high-voltage battery, such as the aforementioned wire harness, there is a concern that a short circuit will occur between the plus and minus high-voltage wires due to an impact imparted when the vehicle collides.

An exemplary aspect of the disclosure provides a wire harness capable of suppressing a short circuit occurring between the plus and minus high-voltage wires, which are electrically connected to an in-vehicle high-voltage battery.

A wire harness according to an exemplary aspect includes a plurality of wires that include a plus high-voltage wire and a minus high-voltage wire, the plus high-voltage wire and the minus high-voltage wire being configured to be electrically connected to an in-vehicle high-voltage battery; a sheathing material for collectively enclosing the plurality of wires, the sheathing material being tube-shaped; and a cover that covers an outer periphery of the sheathing material, the cover being tube-shaped and made of an insulating reinforced fiber, wherein the sheathing material includes a metal pipe having a bend that is bent along a wiring line, and wherein the cover is provided in an area at least including the bend of the metal pipe.

According to this configuration, the sheathing material is covered by the cover that is made of an insulating reinforced fiber, and the impact resistance of the sheathing material is thus increased. As a result, it is possible to suppress a short circuit occurring between the plus and minus high-voltage wires that are electrically connected to the high-voltage battery.

Also according to this configuration, although the bend of the sheathing material tends to be less rigid because, for example, the wall thickness of the bend in the radial direction is small, a breakage of the sheathing material can be effectively suppressed by providing the cover in the area including the bend.

In the above wire harness, the reinforced fiber of the cover is an aramid fiber. According this configuration, since the cover that covers the outer periphery of the sheathing material is made of an aramid fiber, the impact resistance of the sheathing material can be favorably increased.

With the wire harness according to some aspects of the present disclosure, it is possible to suppress a short circuit occurring between the plus and minus high-voltage wires, which are electrically connected to an in-vehicle high-voltage battery. Other modes and advantages of the present disclosure will become apparent from the drawings, which show examples of the technical ideas of the present disclosure, and the following description.

DETAILED DESCRIPTION OF EMBODIMENTS

Figure 1:
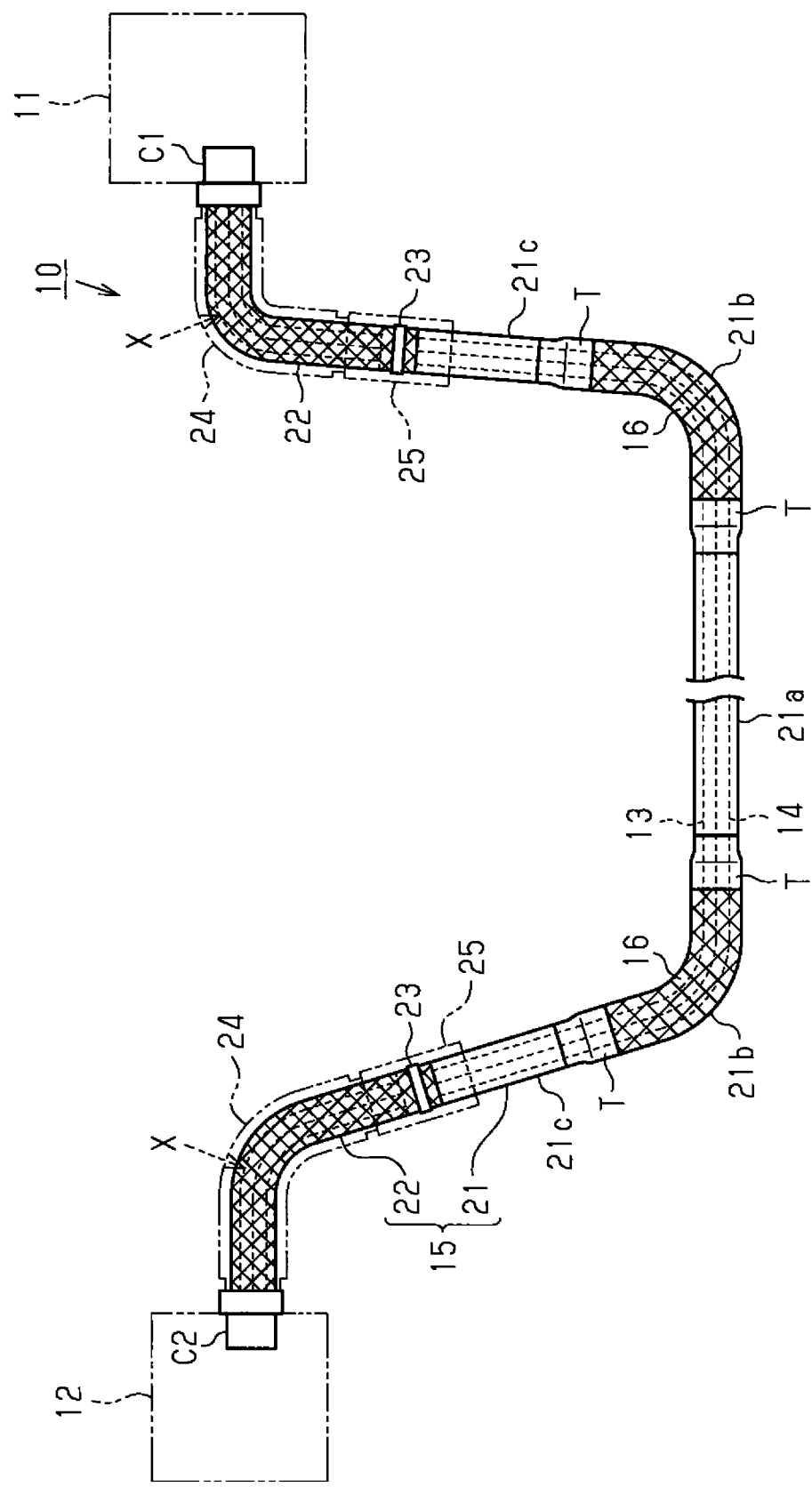
FIG. 1 is a schematic configuration diagram of a wire harness according to an embodiment.

An embodiment of a wire harness will be described below with reference to FIGS. 1 and 2. Note that there may be cases where, in the drawings, some portions of the configuration are exaggerated or simplified for convenience of description. The proportions of some portions may also differ from their actual proportions As shown in FIG. 1, a wire harness 10 according to this embodiment is laid out in a hybrid vehicle, an electric vehicle, or the like, to pass under the vehicle floor in order to connect a high-voltage battery 11, which is installed in a rear portion of the vehicle, to an inverter 12, which is installed in a front portion of the vehicle, for example. The inverter 12 is connected to a motor (not shown) for driving wheels that serves as a motive power source for moving the vehicle, generates alternating-current (AC) power using direct-current (DC) power of the high-voltage battery 11, and supplies the AC power to the motor. The high-voltage battery 11 is a battery capable of supplying a voltage of several hundred volts.

The wire harness 10 includes a plus high-voltage wire 13 and a minus high-voltage wire 14, which are connected, respectively, to a plus terminal and a minus terminal of the high-voltage battery 11, a tube-shaped electromagnetic shielding portion 15, which collectively encloses the high-voltage wires 13 and 14, and protection members 16 (covers) for protecting a metal pipe 21, which constitutes a portion of the electromagnetic shielding portion 15.

Figure 2:
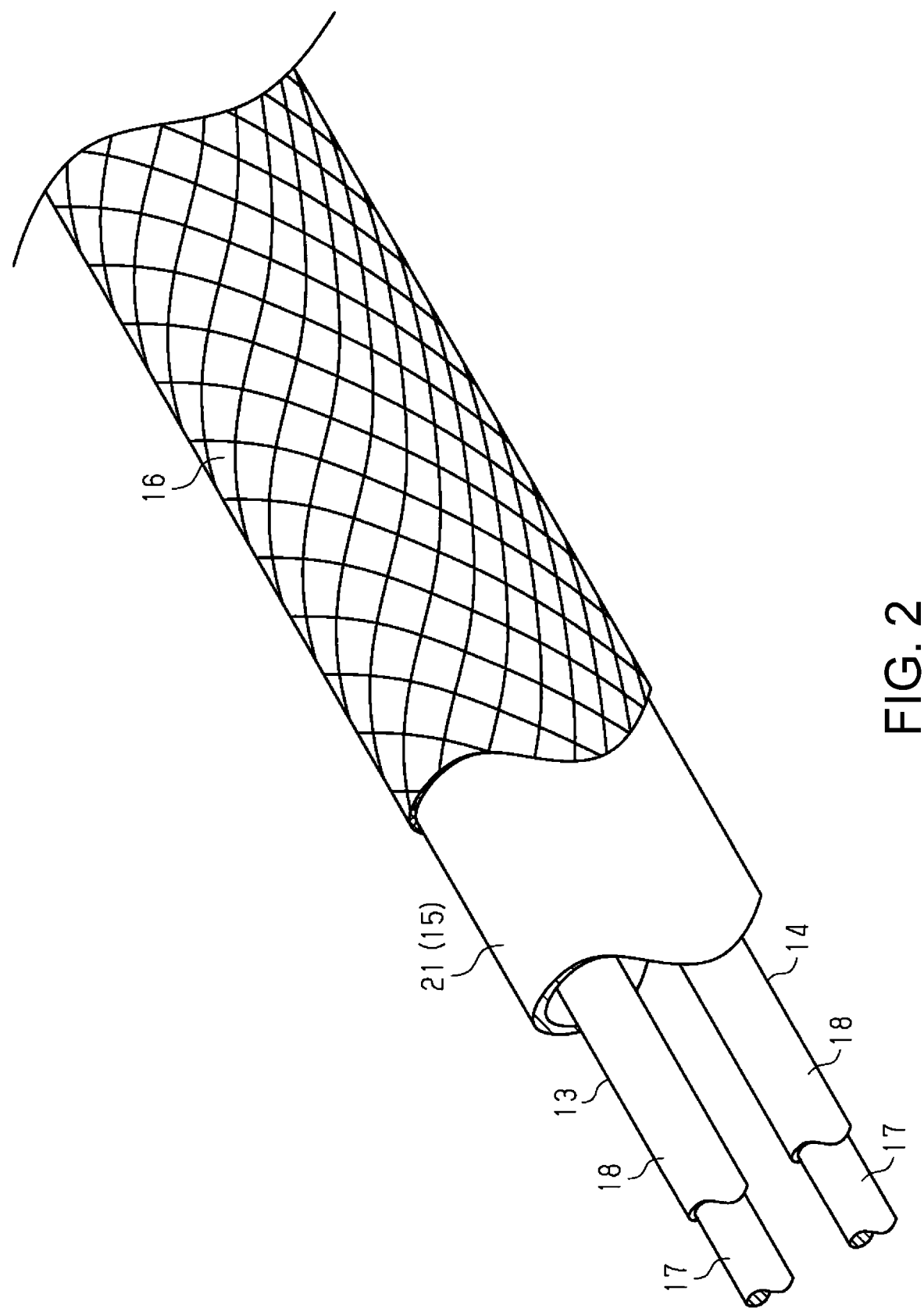
FIG. 2 is a perspective view showing a schematic configuration of the wire harness according to the same embodiment.

The high-voltage wires 13 and 14 are coated wires having core wires 17, which are made of a conductive material, coated with an insulating coating 18 (see FIG. 2). The high-voltage wires 13 and 14 are unshielded wires that do not have a shielding structure on their own, and are wires that can be used for high voltage and large current. The high-voltage wires 13 and 14 are inserted into the electromagnetic shielding portion 15. One end portion of each of the high-voltage wires 13 and 14 is connected to the high-voltage battery 11 via a connector C1, and the other end portion is connected to the inverter 12 via a connector C2.

The electromagnetic shielding portion 15 has an elongated tube shape as a whole. The center portion of the electromagnetic shielding portion 15 in its longitudinal direction is constituted by the metal pipe 21, and an area including both end portions in the longitudinal direction other than the portion constituted by the metal pipe 21 are constituted by braided members 22.

The metal pipe 21 is constituted by a metal material, such as aluminum, for example. The metal pipe 21 is laid out to pass under the vehicle floor, and is laid out while being bent into a predetermined shape corresponding to the configuration under the floor. The metal pipe 21 according to this embodiment has a straight portion 21a, which is laid out under the vehicle floor in the vehicle front-rear direction, bent portions 21b (bends), which are provided on both ends of the straight portion 21a, and upward-extending portions 21c, which extend upward of the vehicle from the respective bent portions 21b. The metal pipe 21 collectively shields the high-voltage wires 13 and 14 that are inserted therein, and protects the high-voltage wires 13 and 14 from gravel or the like.

The braided members 22 are tube-shaped members that are configured by braiding a plurality of metal wires. The braided members 22 are connected to both end portions of the metal pipe 21 in the longitudinal direction with connecting members 23, such as crimping rings, and the braided members 22 and the metal pipe 21 are thus electrically continuous with each other. The outer periphery of the braided members 22 are enclosed by a sheathing material 24, such as a corrugated tube, for example. Rubber grommets 25, which cover the outer periphery of connecting portions between the metal pipe 21 and the braided members 22 to prevent entrance of water, are attached to these connecting portions.

The braided members 22 collectively encloses the outer periphery of portions (out-of-pipe portions X) of the high-voltage wires 13 and 14 that are led out of the end portions of the metal pipe 21. Thus, the out-of-pipe portions X of the high-voltage wires 13 and 14 are shielded by corresponding braided members 22.

As shown in FIGS. 1 and 2, the aforementioned bent portions 21b of the metal pipe 21 are covered and protected by the tube-shaped protection members 16. The protection members 16 are formed by braiding reinforced fiber with excellent insulation properties and shearing resistance, and are flexible.

In this embodiment, the protection members 16 are provided in some portions of the metal pipe 21 in the longitudinal direction. More specifically, two protection members 16 are provided in association with two bent portions 21b of the metal pipe 21. The protection members 16 cover the respective bent portions 21b, and extend in the longitudinal direction of the metal pipes 21 so as to cover the straight portion 21a and the upward-extending portions 21c from the respective bent portions 21b. Both end portions of each of the protection members 16 are fixed to the outer-circumferential face of the metal pipe 21 by winding adhesive tape T around them.

Examples of the reinforced fiber with which the protection members 16 are formed include para-aramid fibers, polyarylate fibers, PBO (poly para-phenylene benzobisoxazole) fibers, PET (polyethylene terephthalate) fibers, ultra-high molecular weight polyethylene fibers, PEI (polyetherimide) fibers, glass fibers, ceramic fibers, and so on. It is preferable to use one or more types of these fibers in accordance with physical properties that the protection members 16 are required to have. In this embodiment, the protection members 16 are made of a single type of fiber, namely a para-aramid fiber.

Next, the operations of this embodiment will be described.

The outer periphery of the metal pipe 21, which collectively encloses the high-voltage wires 13 and 14, is covered by the protection members 16 that are made of a reinforced fiber, such as a para-aramid fiber, and have excellent impact resistance (especially shearing resistance). With this configuration, even if the metal pipe 21 is broken due to an impact when the vehicle collides, it is suppressed that the core wires 17 of the high-voltage wires 13 and 14 directly come into contact with each other, or become continuous with each other via some kind of conductive material, such as a broken piece of the metal pipe 21 or other vehicle components. Furthermore, since the protection members 16 are insulative, it is suppressed that the core wires 17 of the high-voltage wires 13 and 14 become continuous with each other via the protection members 16.

Next, the effects of this embodiment will be described.

(1) The wire harness 10 includes tube-shaped protection members 16, which are made of an insulating reinforced fiber and cover the outer periphery of the metal pipe 21 that constitutes a portion of the electromagnetic shielding portion 15 (sheathing material). According to this configuration, the impact resistance of the metal pipe 21 increases and, as a result, a short circuit occurring between the plus and minus high-voltage wires 13 and 14, which are electrically connected to the high-voltage battery 11, can be suppressed.

(2) The metal pipe 21 has the bent portions 21b, which are bent along a wiring line, and the protection members 16 are provided in an area including the bent portions 21b of the metal pipe 21. In the example shown in the diagrams, the protection members 16 are provided in an L-shaped area or a predetermined length area that includes the bent portions 21b and non-bent portions. According to this configuration, although the bent portions 21 of the metal pipe 21 tend to be less rigid because, for example, the wall thickness of the bent portions 21b in the radial direction is smaller, a breakage of the metal pipe 21 can be effectively suppressed by providing the protection members 16 in an area including the bent portions 21b.

(3) The impact resistance of the metal pipe 21 can be favorably increased by using an aramid fiber as the reinforced fiber that the protection members 16 are made of.

Note that the above embodiment may also be modified as follows.

Although, in the above embodiment, the protection members 16 are provided for the two respective bent portions 21b of the metal pipe 21, this may not necessarily be the case, and the protection member 16 may be provided for only one of the two bent portions 21.

Although, in the above embodiment, the protection members 16 are provided in the areas at least including the bent portions 21b of the metal pipe 21, this may not necessarily be the case, and the protection members 16 may also be provided only in an area excluding the bent portions 21b of the metal pipe 21 (i.e. for the straight portion 21a and the upward-extending portions 21c).

Although, in the above embodiment, the protection members 16 are provided in some portions of the metal pipe 21 in the longitudinal direction, this may not necessarily be the case, and the protection members 16 may also be provided over the entire metal pipe 21 in the longitudinal direction.

In the above embodiment, it is preferable to color the protection members 16 with an identifying color for identifying the wire harness 10 for a high-voltage power supply system. This is particularly effective in the case of providing the protection members 16 over the entire metal pipe 21 in the longitudinal direction.

Although, in the above embodiment, the metal pipe 21 includes two bent portions 21b, this may not necessarily be the case, and the metal pipe 21 may also be configured to include one, or three or more bent portions.

Although, in the above embodiment, the protection members 16 are provided in the metal pipe 21 portion of the electromagnetic shielding portion 15 that serves as a sheathing material, this may not necessarily be the case, and the protection members 16 may also be provided so as to cover the outer periphery of the braided members 22. In this case, the sheathing materials 24, which are corrugated tubes or the like and enclose the outer periphery of the braided members 22, may be omitted. Alternatively, the sheathing materials 24 may be used as-is, and the protection members 16 may be provided on the inner-peripheral side or the outer-peripheral side of the sheathing materials 24.

Although the electromagnetic shielding portion 15 according to the above embodiment is constituted by the metal pipe 21 and the braided members 22, this may not necessarily be the case, and the entire electromagnetic shielding portion 15 in the longitudinal direction may also be constituted by the braided member 22, for example.

Although, in the above embodiment, the electromagnetic shielding portion 15 is used as a sheathing material for collectively enclosing the high-voltage wires 13 and 14, this may not necessarily be the case, and a sheathing material that does not have a shielding function (e.g. a synthetic resin pipe material, such as a corrugated tube) may be used in place of the electromagnetic shielding portion 15.

Although the wire harness 10 according to the above embodiment has a configuration in which two wires, namely the plus high-voltage wire 13 and the minus high-voltage wire 14 are inserted into the electromagnetic shielding portion 15, the configuration of the wires to be inserted into the electromagnetic shielding portion 15 may be modified as appropriate in accordance with the configuration of the vehicle. For example, a configuration may be employed in which a low-voltage wire for connecting a low-voltage battery to various low-voltage devices (e.g. a lamp, a car audio system etc.) is added to the wires to be inserted into the electromagnetic shielding portion 15.

The arrangement relationship between the high-voltage battery 11 and the inverter 12 in the vehicle is not limited to that in the above embodiment, and may be modified as appropriated in accordance with the configuration of the vehicle. Although, in the above embodiment, the high-voltage battery 11 is connected to the inverter 12 via the high-voltage wires 13 and 14, the high-voltage battery 11 may also be configured to be connected to a high-voltage device other than the inverter 12.

Although the above embodiment is applied to the wire harness 10 for connecting the high-voltage battery 11 to the inverter 12, the embodiment may also be applied to a wire harness for connecting the inverter 12 to a motor for driving wheels, for example.

The above embodiment and the modifications may be combined as appropriate.

Next, the technical ideas that can be understood from the above embodiment and the modifications will be additionally described below.

(A) The wire harness as stated above, wherein the sheathing material is constituted by an electromagnetic shielding portion having a shielding function.

According to this configuration, since the sheathing material that collectively encloses a plurality of wires has the shielding function, the wires can be constituted by unshielded wires, making it possible to simplify the configuration of each wire.

(B) The wire harness as stated above, wherein the sheathing material is at least partially arranged outside the vehicle, and the protection member covers a portion of the sheathing material that is arranged outside the vehicle.

According to this configuration, the portion of the sheathing material that is arranged outside the vehicle and is likely to be subjected to impact is covered by the protection member, and the breakage of the sheathing material can be effectively suppressed.

It will be apparent for a person skilled in the art that the present disclosure may be embodied in any other unique modes without departing from the technical idea thereof. For example, some of the components described in the embodiment (or one or more modes thereof) may be omitted, or may be combined.

The invention claimed is:

1. A wire harness comprising:
   a plurality of wires that include a plus high-voltage wire and a minus high-voltage wire, the plus high-voltage wire and the minus high-voltage wire being configured to be electrically connected to an in-vehicle high-voltage battery;
   a sheathing material for collectively enclosing the plurality of wires, the sheathing material being tube-shaped; and
   a cover that covers an outer periphery of the sheathing material, the cover being tube-shaped and made of an insulating reinforced fiber,
   wherein the sheathing material includes a metal pipe having a bend that is bent along a wiring line, and
   wherein the cover is provided in an area at least including the bend of the metal pipe.

2. The wire harness according to claim 1,
   wherein the reinforced fiber of the cover is an aramid fiber.

* * * * *